July 26, 1955 R. L. HUDSON 2,713,718
CLIPPER COMBS
Filed March 24, 1954
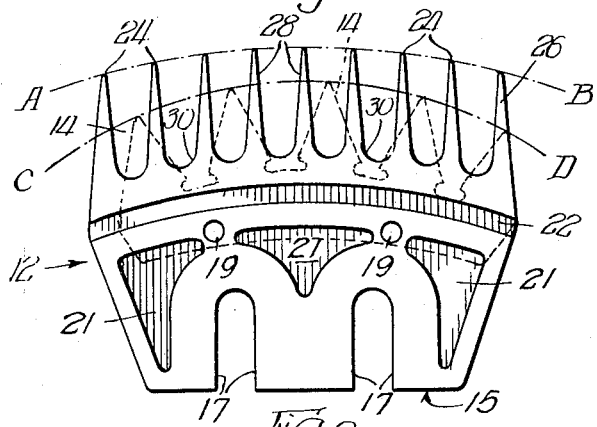
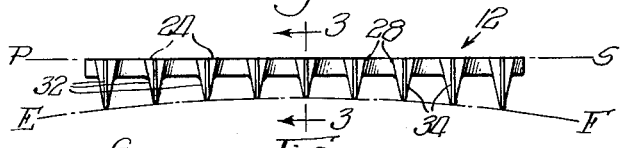
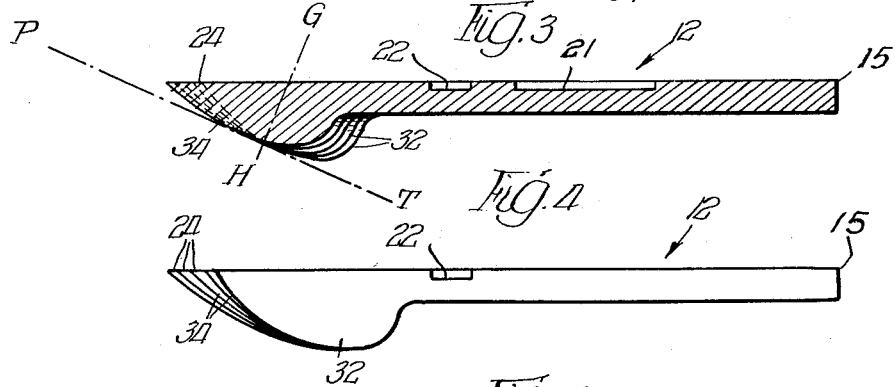
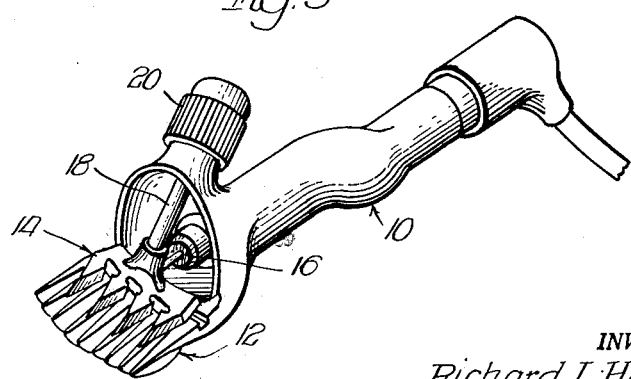
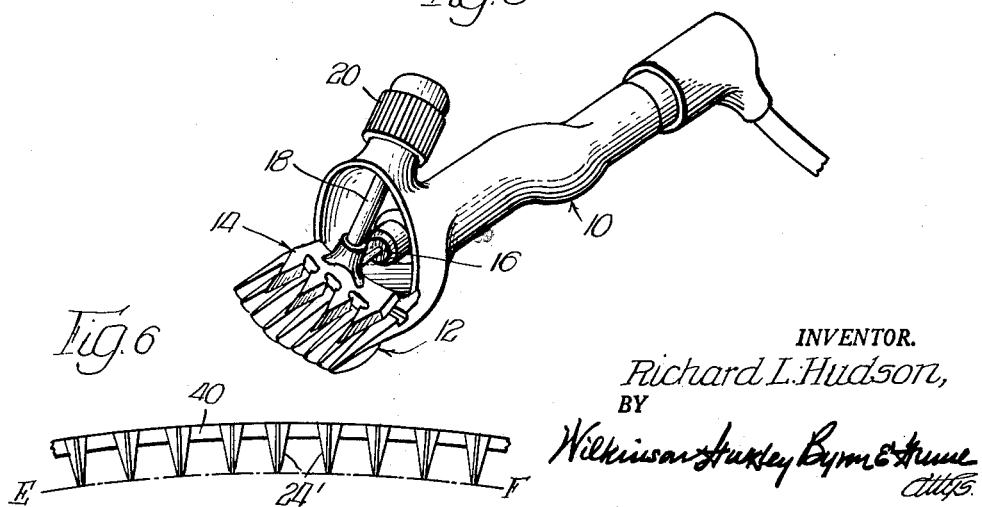
INVENTOR.
Richard L. Hudson,
BY

United States Patent Office 2,713,718
Patented July 26, 1955

2,713,718

CLIPPER COMBS

Richard L. Hudson, Worland, Wyo., assignor of one-half to Alexander Healy, Jr., Worland, Wyo.

Application March 24, 1954, Serial No. 418,317

16 Claims. (Cl. 30—209)

This invention relates to clipping and shearing apparatus, and more particularly to that part known as the "comb" for clippers and shears that are especially adapted to shearing sheep and similar animals. A power-driven shearing tool takes the form of a multiple shears consisting of three principal elements: the comb, which is the lower, relatively stationary member of the shears; the cutter, which is the upper, rapidly oscillating member of the shears; and the handpiece, which includes the means for holding the comb and the cutter in juxtaposition and the means for oscillating the cutter. These elements, due to unequal conditions of wear to which they are respectively exposed, require replacement or renovation at different times during the useful life of the tool. It is for this reason, and also because it is essential to the attainment of a preselected cutting condition to change the comb from time to time, and frequently the cutter as well, that each of the three elements constitutes a separate article of commerce.

Power-driven shears fitted with combs for close shearing have been fairly successful, although even these have not entirely supplanted the ancient simple hand shears. As opposed to close shearing combs, however, the so-called high-stubble combs, which are designed to hold the cutting edges about a quarter of an inch or more from the skin of the animal being shorn, have not been satisfactory. The basic difference between the two combs is in the size and spacing between adjacent teeth and the heights of the teeth governed by runners that depend beneath some or all of them. Close shearing combs have relatively small, closely spaced teeth with no runners, while higher stubble combs have larger, more widely spaced teeth with runners dependent from some or all of them of a height designed to leave the length of stubble desired.

When power-driven shears operate properly, they can be guided accurately and with slight effort, and the operator has the sensation that the tool is drawn toward the skin and through the wool of the sheep by a force-like suction. But if the shears are fitted with a high-stubble comb of the types heretofore known, the operator finds that the shears are extremely difficult to guide accurately, and seem to develop a tendency to climb out of the fleece, which can be overcome only with great effort. If the comb is modified by the removal of every other tooth, leaving a comb with relatively few, widely spaced teeth, the shears can be operated without excessive effort, but the stubble which is left is strongly ridged instead of uniform, and the skins of the animals are often cut.

The high-stubble combs now in use are compromises between the demands of the shearers for a tool which can be used for a full working day without unendurable fatigue, and the requirements of the owners of sheep that the stubble be sufficiently uniform to serve its purpose of protecting shorn animals from inclement weather and leaving usable pelts on lambs intended for the market. The pelts on animals marked for slaughter are rated according to the length of the shortest wool remaining after shearing. Thus, a number 1 pelt has no stubble less than ½-inch in length, while a number 2 pelt has no stubble less than ¼-inch. The time an animal must remain in the feeding pens, and, hence, the amount of expense to which owners are put in readying their sheep for market, sometimes depends upon the time required to attain the growth of wool requisite to a number 1 or number 2 pelt, as the case may be. Although the price of the pelt can be a significant consideration in the overall price for which the animal is sold, any gain therefrom is frequently lost by the necessity of retaining animals in the feeding pens for the overly-long periods required to restore poorly sheared pelts to commercially acceptable condition. Therefore, it is essential that the animals not only be sheared as close as conditions warrant to insure the maximum yield of wool per animal, but that the shearing be accomplished with reasonable uniformity, so that the period in the feeding pens during which the animals are readied for market can be kept to a minimum.

Previous efforts to effect such results have, in some instances, involved the use of shear combs, the teeth of which are closely spaced, and only alternate teeth of which are provided with runners. In others, the teeth are spaced widely, but not so widely that the purposes of the high stubble are entirely defeated. Neither expedient has yielded more than a partial solution to the problem.

I have found that high-stubble combs can be greatly improved to give uniform pelts by arranging the lowermost points of the various runners, which rest upon the skin of the animal being shorn, in a concave configuration. When this is done, the teeth can be spaced fairly closely, for example at an interval of ⅜-inch between centers, and every tooth can be provided with a runner, and yet the motion of the shears through the wool can be controlled easily, and will exhibit the same "suction" effect as when they are fitted with a well designed close-shearing comb.

Presumably, the new result might be attributable to the approach toward conformity with the convex body of a sheep, although since it is obviously impossible for a single comb to fit accurately the natural curvatures of the various portions of a sheep's body, some less apparent reasons are suggested as controlling. Even a slight curvature, scarcely perceptible to the eye, yields a marked improvement in the handling characteristics of the shears.

I have not been able to formulate a satisfactory theory to account entirely for the success of the improved comb over the failure of previous high-stubble combs. Most parts of a sheep's body are so yielding that they can be distorted into conformity with a flat surface about three inches wide by only a slight force. In the case of close-shearing combs, this is accomplished by the above-mentioned "suction" without effort on the part of the shearer. Perhaps, in a conventional high-stubble comb, there is a tendency for stubble to become interposed between the runners and the skin of the animal on one side of the comb, or on both sides, where the pressure between the comb and the sheep is least. This may be a factor in the tendency of known high-stubble combs to resist steering, and to climb out of the wool, and the improved distribution of pressure among the runners in my improved comb may explain its success. However, this theory seems scarcely adequate to explain the startling difference between an ordinary comb which conforms to a flat surface and one of the present invention which has a nearly imperceptible concavity.

This has led to further theorizing, in which the curvature of the various elements is taken into consideration, together with the various angles at which a shearing tool is held in the clipping operation against the yielding contours of the animal. The teeth of the comb as regarded in plan view are of equal length and are essentially parallel, but terminate in an arc the crown of which is at the end of the central tooth. The cutter itself has teeth that fan out along radii of an arc that is smaller than the arc to which the comb teeth are set, and this lesser arc corresponds to the path of movement of the cutter with respect to the teeth of the comb. This means the cutter teeth pass closer to the ends of the central teeth of the comb than they do to the ends of the adjacent teeth, and pass farthest from the ends of the outside so-called "bull-teeth" thereof. Opposed to these two convex arcuate arrangements, the runners collectively define a concave arc in height, which means that the most prominent tooth of the comb regarded collectively in plain view in the convex arc just described, which is the central tooth, has the runner of least height; while the end teeth of the comb, least prominent in the convex arrangement, the so-called "bull-teeth," have runners of equally superior height to all of the others, which are graded between these extremes.

As regarded in longitudinal section, the runners, while varying in height, are approximately of equal length, and have rocker bottoms. With the top surfaces of the teeth in coplanar relation, as is the case in the primary embodiment of the invention, the teeth and runners, due to the convexity previously described, are horizontally offset when regarded in longitudinal section, while the runners as so regarded, by virtue of the concavity mentioned above, have their bottom edges vertically offset. These two offsets, combined with the arcs defining the rocker bottoms of the runners, establish the fact that there can be but one plane of tangency (the ideal plane of attack) common to all the runners simultaneously. Neglecting several minor considerations through which minor variables arise, it will be seen that straight lines directed from this line of tangency upwardly to the plane of the tops of the teeth of the comb, and more especially to those portions of that plane in which the cutter is effective (the plane of shear), are of equal length. It follows, then, that if the hide of the animal being sheared is caused to yield under normal operating pressure to the extent of conforming to the ideal plane of attack, the wool must be cut off to equal length, and a uniform stubble will result. In this case the stubble stands generally perpendicular to the ideal plane of attack, but not to the plane of shear.

If a plane of less angle is used, that is, one in which the heel of the comb is nearer to or at the surface of the hide of the animal, operating pressure causes the hide to stretch in chordal relation to the concavity between the bull-teeth of superior height, so that the hide and plane of shear are substantially parallel to yield stubble of uniform length. In this case, the stubble stands generally perpendicular to both the plane of attack and the plane of shear.

If a plane of greater angle than the ideal plane of attack is used, wherein the stubble is perpendicular to neither the plane of attack nor the plane of shear, but approaches parallelism with the latter, the central convex teeth of the comb are given prominence, while the bull-teeth relatively recede, and the hide is depressed concavely so as to tend to wrap around the comb. Then it is the effective distance at which the cutter operates from the ends of the teeth of the comb that controls. Since the concave disposition of the hide would tend to bring the margins of the swath being cut the nearest to the plane of shear, due regard being had for the fact that the latter is at least a flat plane now chordally disposed in relation to the hide, the crop at these points would be too short but for the smaller arc of travel of the cutter which makes the end teeth of the comb of greater effective length to prevent this, thus to insure a uniform stubble.

The standard handpieces are constructed so that the cutter oscillates about an axis which is perpendicular to the upper surface of the comb; therefore, the plane of shear is essentially flat, as is assumed in the foregoing discussion. A comb for use with standard handpieces and cutters must have a plane upper surface, and, if it is to partake of the advantages of my invention, it must have runners that have a concave lower configuration. The comb can, however, be further modified by giving its upper surface a curvature that is at least approximately parallel with its lower configuration, so that the runners, while in concave configuration, are of equal height. This would require modification of the standard cutters and handpieces. By arranging the pivot in the handpiece at an angle, the cutter and the upper surface of the comb may be made conical; or they may be made cylindrical by using an apivotal mounting for the cutter so that it oscillates about an axis parallel to the upper surface of the comb. By these modifications, even more critical controls might be expected in accordance with the foregoing theories.

In the following detailed description, reference is made to the drawings, in which—

Figure 1 is a plan view of one form of the improved comb, drawn to true scale;

Figure 2 is a front end view of the same comb also drawn to scale;

Figure 3 is an enlarged somewhat exaggerated sectional view on the line 3—3 of Figure 2;

Figure 4 is a correspondingly enlarged and exaggerated side elevational view thereof;

Figure 5 is a reduced perspective view of a shearing clipper showing the relationship between the several parts; and Figure 6 is a front end view of a modified form of comb made in accordance with the present invention.

Referring more particularly to the drawings, and first with reference to Figure 5 thereof, there is shown a conventional form of sheep shearing clippers which comprises a handpiece 10, which supports, at its lower forward edge in detachable relation thereto, a comb 12. The comb is stationary with respect to the handpiece, and a cutter 14 is reciprocable with respect to the comb in effecting the shearing operation. The cutter is pivotally mounted and secured to a vibrating mechanism 16 carried within the handpiece. The cutter is held against the top of the comb relative to which it oscillates by means of a tension rod 18 which is adapted to vibrate with the cutter, and to bear thereon with a pressure that is controlled by means of an adjusting knob 20.

The subject of the present invention is the comb 12, which is more specifically set forth in Figures 1 to 4. In these figures is shown an integral piece of metal specially shaped for fitting to the handpiece of a standard shears. For this purpose, the heel edge 15 of the comb is provided with slots 17 by means of which the comb is slipped into position on the handpiece and made fast thereto. The body portion of the comb, after conventional practice, is provided with holes 19 for use in sharpening the comb, and is sometimes provided with depressions 21 to eliminate weight and excess metal that must be ground away in sharpening the comb. The comb also has an arcuate slot 22 which is customarily provided for scavenging foreign matter from the surface of the plane of shear upon which the oscillating cutter 14 actuates.

The front end of the comb as regarded in plan view is contoured generally to the same arcuate curvature as the slot 22 and has extending from its forward edge a plurality of teeth 24 of substantially equal length, the top surfaces 26 of which are coplanar, and the side edges 28 of which are sharpened to afford stationary cutting edges for coaction with the movable cutter 14. The movable cutter 14 is shown in dotted lines in Figure 1. The teeth of the comb in a preferred embodiment of the invention are, for a 3-inch standard comb, nine in number, having their centers ⅜-inch apart. The front ends of the teeth terminate in an arc AB as seen in Figure 1, which is usually about a 6-inch radius. The teeth of the cutter 14, by comparison, fan out along radii of an arc CD that is somewhat smaller than the arc AB, and usually in the order of a 3½-inch radius. The arc CD also is the path of travel through which the ends of the cutter move across the teeth of the comb. The effective cutting area as shown in Figure 1 in accordance with these dimensions lies between the arc CD and the base portions 30 of the cutter teeth. The comb teeth 24 project beyond the effective path CD of the cutter by an amount equal to about ¼-inch at the center tooth, enlarging to $7/16$-inch at the outside teeth, which are the so-called bull-teeth. These dimensions are not critical, but conform to standard shearing combs and clipper assemblies in current use.

As regarded in the front view of Figure 2, it will be seen that the teeth 24 of the comb are provided with runners 32, which are of least height at the middle tooth of the comb and get progressively higher outwardly to the bull-teeth.

In the examples given, the difference in the height of adjacent teeth is in the order of $1/64$ inch, making an overall difference between the central tooth and the bull-teeth of $1/16$-inch. This disposes the portions of the bottoms of the runners in concave configuration relative to each other along an arc EF having a radius equal approximately 16 inches. Absolute adherence to the arcuate disposition of the runners is not essential so long as the symmetrical arrangement is adhered to and provided the overall concavity does not materially exceed the values given here for a 3-inch comb.

Referring to Figure 3, it will be seen that the convexity AB of the teeth in Figure 1 causes the runners, as well as the teeth, to be horizontally offset from each other in directions longitudinally of the comb. Furthermore, it will be seen that by virtue of the concave arc EF effecting the height of the runners as shown in Figure 2, the bottom portions of these latter are also offset vertically with respect to each other. Since the runners are of the same longitudinal dimension, and since each is provided with a curved or rocker bottom 34, it is possible for them all to be tangent to only one plane, indicated as PT in Figure 3, simultaneously. This has previously been referred to as the "ideal plane of attack." If the hide of the animal being sheared is caused to address the comb along this plane, then the fleece will extend upwardly therefrom substantially along the perpendicular GH, which is normal to the ideal plane of attack, and will be evenly severed in a uniform manner.

If the angle of the clipper, and hence the angle of the comb, is diminished with respect to its plane of attack, or, in other words, so that the heel of the clipper 15 approaches or rests upon that plane, then the more prominent bull runners will afford the bearings for the comb, and the middle runners will be lifted relatively clear thereof. In this condition, the plane of shear P—S will be substantially parallel to the plane of the hide of the animal, which will extend between the bull-teeth in chordal relation to the concave arc EF.

It will be seen that in either of these assumed conditions, the length of stubble generally along the perpendicular GH will be sheared off in uniform length. As the angle of the tool, and hence the comb, is increased in relation to the hide of the animal, the central teeth afford the bearing on the hide, while the bull-teeth and the intermediate teeth recede therefrom by virtue of the effect of the convex arc AB of the teeth coming into prominence over the concave arc of the runners EF. This causes the hide of the animal to be depressed so that it tends to wrap around the comb, and thus would subject the fleece nearest the bull-teeth to the shortest cropping were it not for the fact that the effective length of the teeth gradually increases from the central tooth outwardly. In the illustrated example, the cutter is shown and described as having a ¼-inch clearance at the central tooth, increasing to $7/16$-inch at the bull-teeth, representing the difference in curvature between the arcs AB and CD. Thus, the tendency to crop too short at the marginal points of the swath, as would be the case in a conventional comb, is corrected in the comb of the present invention to give a uniform stubble, as has already been explained in the fore part of the specification.

In Figure 6, there is illustrated a comb having a convex surface of shear 40, which is parallel to the curve EF of the runners 24'. In this case, since the body of the comb and the teeth are set to an arc, the runners are all of equal height. The radius of the curvature for the parts may be the same as that for the arc EF, Figure 2, or may be of greater curvature, as, for instance, one having a radius of about 8 inches. The disadvantage of this form is that it is not adapted to standard handpieces now in use, as they all have the flat planar type of cutter comb and cutter motion. Nevertheless, by making the cutter reciprocate apivotally, or by making the surface 40 conical and by mounting the cutter on an oblique pivot, the comb of Figure 6 can be readily adapted to otherwise standard handpieces.

I claim:

1. A clipper comb comprising a body portion having a plurality of teeth projected from the front edge thereof, the tops of said teeth lying within the plane of shear, a runner dependent from the bottom of each tooth, the lower portions of said runners terminating in an arcuate line that is concave with respect to the comb.

2. The invention of claim 1, said teeth projecting outwardly in the plane of shear and terminating in an arcuate line that is convex with respect to the comb.

3. The invention of claim 2, including, in combination, a cutter having teeth radiating therefrom, the bottoms of which are conformed to said plane of shear, and the extremities of which terminate in an arcuate line that is convex with respect to said cutter, the latter line being of lesser radial extent than the arcuate line in which the teeth of the comb terminate.

4. The invention of claim 3, in which the bottom contours of said runners running axially of said teeth are of convex rocker shape.

5. The invention of claim 4, said runners being mutually tangent to but a single common plane along a line running transversely thereto with the comb disposed at a critical angle to said plane.

6. The invention of claim 5, further characterized by the fact that as the angle of said comb is diminished with respect to said common plane, only the end teeth thereof remain tangent thereto, while, as the angle of said comb is increased with respect to said common plane only the central tooth or teeth remain tangent thereto.

7. The invention of claim 2, in which the plane of shear is flat, and said runners are of graduated height from the least at the center to the greatest at the ends.

8. The invention of claim 2, in which the plane of shear is curved convexly, and said runners are of equal height as measured from said plane of shear.

9. The invention of claim 2, in which the bottom contours of said runners running axially of said teeth are of convex rocker shape.

10. The invention of claim 1, in which the plane of shear is flat, and said runners are of graduated height from the least at the center to the greatest at the ends.

11. The invention of claim 10, in which the bottom contours of said runners running axially of said teeth are of convex rocker shape.

12. The invention of claim 1, in which the plane of shear is curved convexly, and said runners are of equal height as measured from said plane of shear.

13. The invention of claim 12, in which the bottom contours of said runners running axially of said teeth are of convex rocker shape.

14. The invention of claim 1, the bottom contours of said runners running axially of said teeth being of convex rocker shape.

15. The invention of claim 14, said runners being mutually tangent to but a single common plane along a line running transversely thereto with the comb disposed at a critical angle to said plane.

16. The invention of claim 1, including, in combination, a cutter having teeth radiating therefrom, the bottoms of which are conformed to said plane of shear, and the extremities of which terminate in an arcuate line that is convex with respect to said cutter, the latter arcuate line defining also the outer limits of the path of travel of said cutter teeth with respect to the teeth of said comb, said path passing closer to the ends of the central teeth of the latter than to the ends of the end teeth thereof.

References Cited in the file of this patent

UNITED STATES PATENTS 1,730,889   Hoberecht _____ Oct. 8, 1929